(12) United States Patent
Takatsu et al.

(10) Patent No.: US 12,248,308 B2
(45) Date of Patent: Mar. 11, 2025

(54) WORKPIECE TRANSPORT SYSTEM AND WORKPIECE TRANSPORT METHOD

(71) Applicant: AMADA CO., LTD., Kanagawa (JP)

(72) Inventors: Satoshi Takatsu, Kanagawa (JP); Naofumi Miura, Kanagawa (JP); Shuhei Terasaki, Kanagawa (JP); Teruyuki Kubota, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 179 days.

(21) Appl. No.: 18/032,359

(22) PCT Filed: Oct. 8, 2021

(86) PCT No.: PCT/JP2021/037388
§ 371 (c)(1),
(2) Date: Apr. 18, 2023

(87) PCT Pub. No.: WO2022/091751
PCT Pub. Date: May 5, 2022

(65) Prior Publication Data
US 2023/0390919 A1 Dec. 7, 2023

(30) Foreign Application Priority Data
Oct. 28, 2020 (JP) .................... 2020-180480

(51) Int. Cl.
*G05B 19/418* (2006.01)
*B25J 9/10* (2006.01)
*B25J 9/16* (2006.01)

(52) U.S. Cl.
CPC ............ *G05B 19/4189* (2013.01); *B25J 9/10* (2013.01); *B25J 9/1697* (2013.01); *B25J 9/1692* (2013.01);
(Continued)

(58) Field of Classification Search
CPC . B25J 9/10; B25J 9/1687; B25J 9/1692; B25J 9/1697; G05B 19/4189;
(Continued)

(56) References Cited

U.S. PATENT DOCUMENTS

| 2003/0088337 A1* | 5/2003 | Watanabe | G06T 7/74 |
| | | | 700/259 |
| 2021/0094187 A1* | 4/2021 | Kanemoto | G06T 7/66 |

FOREIGN PATENT DOCUMENTS

JP 2018-120388 A 8/2018

OTHER PUBLICATIONS

Extended European Search Report for corresponding EP Application No. 21885870.2 dated Mar. 20, 2024.
(Continued)

*Primary Examiner* — Dale Moyer
(74) *Attorney, Agent, or Firm* — Renner, Otto, Boisselle & Sklar, LLP

(57) ABSTRACT

A height error of a workpiece holding portion is detected based on a height from a mounting pedestal side floor surface, on which a mounting pedestal is mounted, to a connection point between the workpiece holding portion and an arm unit at a point in time at which contact with a detection target is detected by a surface detection sensor, a height from the mounting pedestal side floor surface to a surface of the detection target, and a theoretical value of a height of the workpiece holding portion, and an actual loading height of a workpiece mounted on the mounting pedestal is detected in consideration of the height error of the workpiece holding portion.

8 Claims, 7 Drawing Sheets

(52) U.S. Cl.
CPC ............. *G05B 2219/40014* (2013.01); *G05B 2219/40252* (2013.01); *G05B 2219/40607* (2013.01); *G05B 2219/45063* (2013.01); *G05B 2219/50378* (2013.01)

(58) Field of Classification Search
CPC ........... G05B 2219/37002; G05B 2219/37555; G05B 2219/40014; G05B 2219/40252; G05B 2219/40564; G05B 2219/40607; G05B 2219/45063; G05B 2219/50378
See application file for complete search history.

(56) References Cited

OTHER PUBLICATIONS

International Search Report for corresponding Application No. PCT/JP2021/037388, mailed Jan. 11, 2022.

\* cited by examiner

WORKPIECE TRANSPORT SYSTEM AND WORKPIECE TRANSPORT METHOD

TECHNICAL FIELD

The present invention relates to a workpiece transport system and a workpiece transport method for automatically transporting a workpiece arranged at a mounting place.

BACKGROUND ART

Conventionally, there is known a working system configured to hold a workpiece arranged at a mounting place such as a pallet with a workpiece holding robot so as to transport the workpiece to a working machine such as a bending machine (Patent Literature 1).

The working system described in Patent Literature 1 is configured to photograph the entire mounting place with one camera installed directly above the center of the mounting place and to detect the position and the loading height of the workpiece based on the photographed image of the workpiece so as to control a workpiece holding robot based on information on the detected position and loading height of the workpiece.

Further, in the working system described in Patent Literature 1, a sensor (an actual loading height detection unit) for detecting an actual loading height of the workpiece is attached to a portion holding the workpiece of the workpiece holding robot, and the working system is configured to update the latest actual loading height, which is obtained by subtracting the thickness of one sheet of workpiece from the actual loading height of the workpiece detected by the sensor, as a loading height of the workpiece after an uppermost workpiece is transported. According to the working system described in Patent Literature 1 that has such a configuration, since it is possible to improve a detection accuracy of the loading height of the workpiece, the operation accuracy of the workpiece holding robot can be maintained at a high level.

CITATION LIST

Patent Literature

Patent Literature 1: Japanese Patent Application Laid-Open Publication No. 2018-120388

SUMMARY

Technical Problem

However, in the working system described in Patent Literature 1, since the actual loading height of the workpiece is specified only by a mechanical theoretical value at a point in time at which the sensor reacts, an error may be generated between the loading height of the workpiece specified by the mechanical theoretical value and the actual loading height of the workpiece due to mechanical factors such as adjustment or change of an attachment position of the sensor by the user, or a deflection of a frame to which the sensor is attached. This may reduce the detection accuracy of the actual loading height of the workpiece. Further, since such a reduction in the detection accuracy of the actual loading height of the workpiece is directly linked to a reduction in a position detection accuracy of the workpiece, the operation accuracy of the workpiece holding robot may be reduced.

Therefore, an object of the present invention is to provide a workpiece transport system and a workpiece transport method that enable detection of an actual loading height of a workpiece with high accuracy.

Solutions to Problem

A workpiece transport system according to the present invention is a workpiece transport system including a mounting pedestal on which a workpiece can be mounted and a workpiece holding robot configured to be able to transport, from the mounting pedestal, the workpiece mounted on the mounting pedestal, the workpiece holding robot including a workpiece holding portion capable of holding the workpiece, an arm unit configured to bring the workpiece holding portion close to or away from a detection target, and a surface detection sensor capable of detecting that the workpiece holding portion is brought into contact with the detection target, the workpiece transport system being configured to detect a height error of the workpiece holding portion based on a height from a mounting pedestal side floor surface, on which the mounting pedestal is mounted, to a connection point between the workpiece holding portion and the arm unit at a point in time at which contact with the detection target is detected by the surface detection sensor, a height from the mounting pedestal side floor surface to a surface of the detection target, and a theoretical value of a height of the workpiece holding portion, and to detect an actual loading height of the workpiece mounted on the mounting pedestal in consideration of the height error of the workpiece holding portion.

Further, a workpiece transport method according to the present invention is a workpiece transport method for transporting, from a mounting pedestal, a workpiece mounted on the mounting pedestal with a workpiece holding robot, the workpiece holding robot including a workpiece holding portion capable of holding the workpiece, an arm unit configured to bring the workpiece holding portion close to or away from a detection target, and a surface detection sensor capable of detecting that the workpiece holding portion is brought into contact with the detection target, the workpiece transport method including detecting a height error of the workpiece holding portion based on a height from a mounting pedestal side floor surface, on which the mounting pedestal is mounted, to a connection point between the workpiece holding portion and the arm unit at a point in time at which contact with the detection target is detected by the surface detection sensor, a height from the mounting pedestal side floor surface to a surface of the detection target, and a theoretical value of a height of the workpiece holding portion, and detecting an actual loading height of the workpiece mounted on the mounting pedestal in consideration of the height error of the workpiece holding portion.

Advantageous Effects of Invention

According to the present invention, it is possible to provide a workpiece transport system and a workpiece transport method that enable detection of an actual loading height of a workpiece with high accuracy.

DESCRIPTION OF EMBODIMENTS

Hereinafter, a preferable embodiment in carrying out the present invention will be described with reference to the drawings. It should be noted that the following embodiment does not limit the invention according to each claim, and not all combinations of features described in the embodiment are essential for the means for solving the invention. Further, in the present embodiment, the scale and dimensions of each component may be shown in exaggeration, or some components may be omitted.

[Overall Configuration of Workpiece Transport System]

Figure 1:
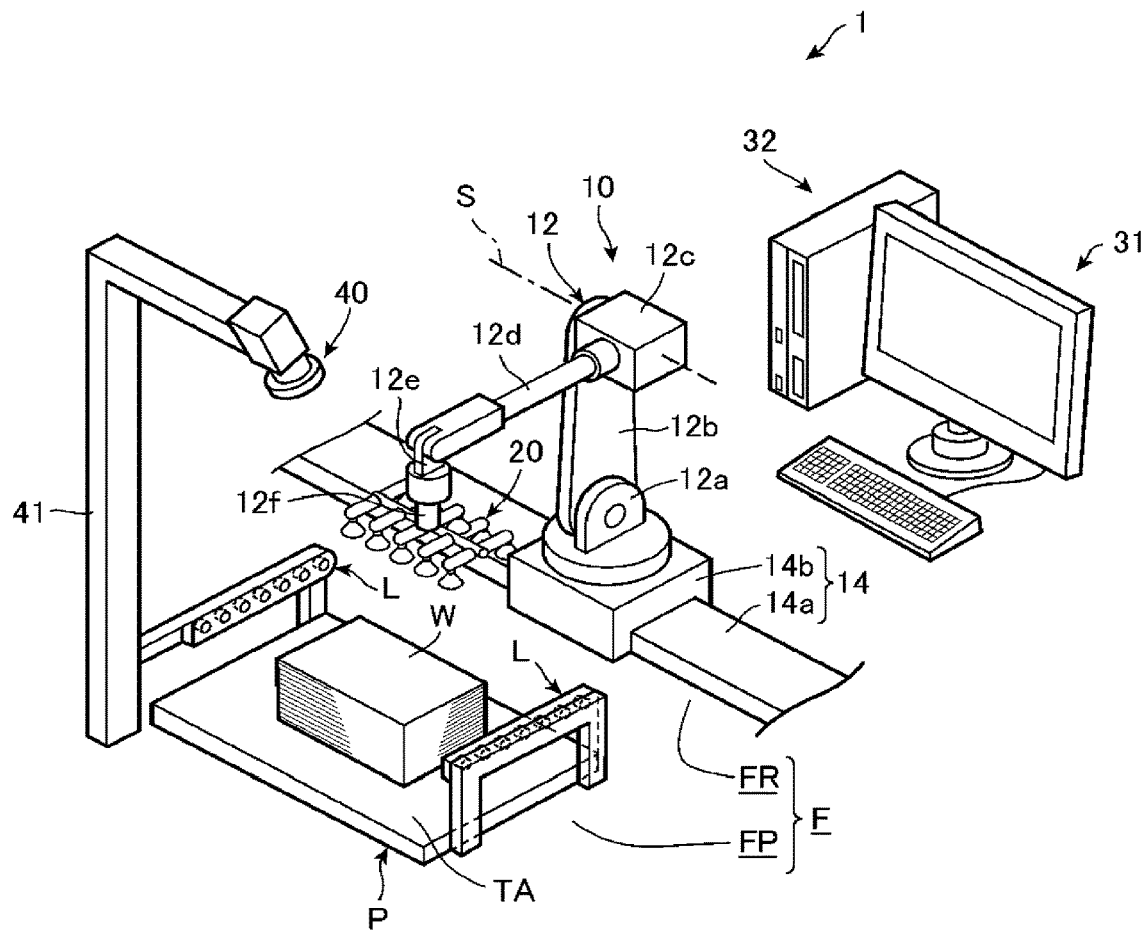
FIG. 1 is a perspective view schematically showing a configuration example of a workpiece transport system according to an embodiment of the present invention.

FIG. 1 is a perspective view schematically showing a configuration example of a workpiece transport system 1 according to an embodiment of the present invention. As shown in FIG. 1, the workpiece transport system 1 according to the present embodiment includes a mounting pedestal P including a loading area TA on which the workpiece W can be mounted, a workpiece holding robot 10 configured to be able to transport (carry out) the workpiece W mounted on the mounting pedestal P from the mounting pedestal P, and a camera system 30 (see FIG. 6) for photographing the workpiece W mounted on the mounting pedestal P so as to detect a position and a loading height of the workpiece W based on the photographed image of the workpiece W. In addition, the workpiece transport system 1 according to the present embodiment may further include a working machine such as a bending machine, and may constitute an automatic working system for the workpiece W together with the working machine.

In the workpiece transport system 1 according to the present embodiment, the mounting pedestal P and the workpiece holding robot 10 are installed on a floor surface F of a work place as shown in FIG. 1. Specifically, the workpiece holding robot 10 is installed on a floor surface (hereinafter referred to as "robot side floor surface FR") in a vicinity of the working machine, and the mounting pedestal P is installed on a floor surface (hereinafter referred to as a "mounting pedestal side floor surface FP"), for example, in an area opposite to the working machine with the workpiece holding robot 10 being a boundary. It is preferable that the robot side floor surface FR and the mounting pedestal side floor surface FP form a flush floor surface F without a height gap, but the height gap between them may exist due to a distortion, a step, or the like of the floor surface F. Hereinafter, the height gap between the robot side floor surface FR and the mounting pedestal side floor surface FP is referred to as a "floor surface height gap Hgap". Note that the floor surface height gap Hgap can be specified by calibration processing to be described later.

[Configuration of Mounting Pedestal]

Figure 4:
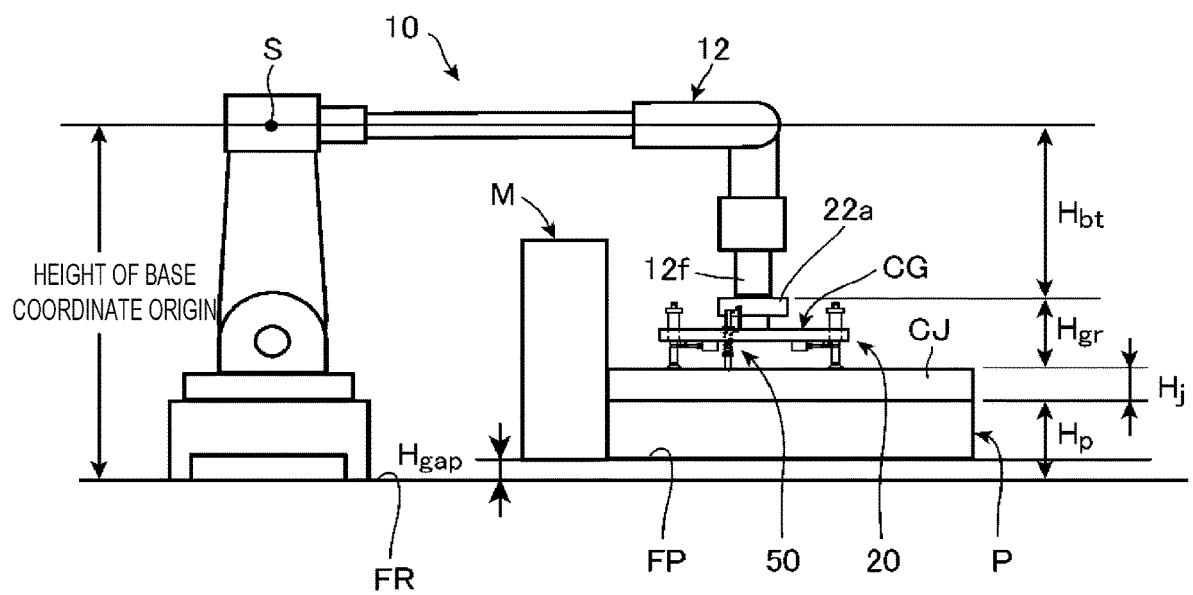
FIG. 4 is a schematic diagram showing height relations among the respective configurations at the time of calibration processing.

As shown in FIG. 1, the mounting pedestal P is a pallet mounted on the mounting pedestal side floor surface FP, and includes the loading area TA on the upper surface thereof, on which the workpiece W can be mounted. A height of the mounting pedestal P (hereinafter referred to as a "mounting pedestal height Hp") can be mechanically fixed or uniquely specified, and can be specified by, for example, the calibration processing to be described later. Note that in the present specification, the mounting pedestal height Hp is a height that uses the robot side floor surface FR as a reference, that is, a linear line length along the vertical direction from the robot side floor surface FR to an upper surface of the mounting pedestal P in the loading area TA. Therefore, as shown in FIG. 4, when the floor surface height gap Hgap exists, for example, the mounting pedestal height Hp is intended to be a height including the floor surface height gap Hgap.

Further, at predetermined positions in the periphery of the mounting pedestal P, a magnet floater M (not shown in FIG. 1, see FIG. 4 and the like) for levitating, with a magnetic force, an uppermost workpiece W from among a plurality of the workpieces W loaded in the loading area TA, and a lighting facility L including a plurality of pieces of light emitting diodes (LEDs) or the like capable of irradiating, with an irradiation beam, the workpiece W loaded in the loading area TA. The workpiece transport system 1 according to the present embodiment is configured to assist the workpiece holding robot 10 in holding the workpiece W by way of the magnet floater M and also to assist the camera 40 to be described later in photographing the workpiece W by way of the lighting facility L. Note that since various known configurations can be arbitrarily adopted for the mounting pedestal P, the magnet floater M, and the lighting facility L, detailed description thereof will be omitted.

[Configuration of Workpiece Holding Robot]

As shown in FIG. 1, the workpiece holding robot 10 is arranged between the mounting pedestal P and a transport destination of the workpiece W (for example, the working machine or the like), and is configured to hold the uppermost workpiece W from among the plurality of workpieces W loaded in the loading area TA so as to transport the workpiece W toward the transport destination such as the working machine.

Specifically, the workpiece holding robot 10 includes a moving mechanism 14 for moving the workpiece holding robot 10 on the robot side floor surface FR, a robot hand (a workpiece holding portion) 20 capable of holding the workpiece W, an arm unit 12 that brings the robot hand 20 close to or away from the workpiece W (an detection target), a surface detection sensor 50 capable of detecting that the robot hand 20 is brought into contact with the workpiece W (the detection target), and a robot control unit 60 that controls the workpiece holding robot 10.

The moving mechanism 14 is a so-called linear motion mechanism that includes a rail 14a laid on the robot side floor surface FR, a base pedestal 14b capable of moving along the rail 14a, and base pedestal driving means (not shown) that drives the base pedestal 14b, and is configured to move the workpiece holding robot 10 on the robot side floor surface FR based on a control signal from the robot control unit 60. Note that since various known configurations can be adopted for the moving mechanism 14, detailed description thereof will be omitted.

One end of the arm unit 12 is connected to the base pedestal 14b of the moving mechanism 14, and another end thereof is connected to the robot hand 20. The arm unit 12 is configured to bring the robot hand 20 close to or away from the workpiece W based on the control signal from the robot control unit 60. In the present embodiment, the arm unit 12 is an articulated arm including a 6-axis control axis, and is configured to be able to not only transport the workpiece W from the mounting pedestal P, but also transport (carry in) the workpiece W to the working machine or the like, assist in processing (bending) the workpiece W, and transport (carry out) a product (a bent product) from the working machine or the like, and the like.

Specifically, as shown in FIG. 1, the arm unit 12 includes an arm support member 12a provided on an upper portion of the base pedestal 14b, a lower arm 12b connected to a distal end of the arm support member 12a, a first upper arm 12c connected to a distal end of the lower arm 12b, a second upper arm 12d connected to a distal end of the first upper arm 12c, a first wrist 12e connected to a distal end of the second upper arm 12d, a second wrist 12f connected to a distal end of the first wrist 12e, and driving means (not shown) such as a motor for driving each of these components.

The arm support member 12a can swivel in the horizontal direction with respect to the base pedestal 14b with a vertical (perpendicular) axis as a center thereof, the lower arm 12b can swing in the vertical direction with respect to the arm support member 12a with a horizontal axis as a center thereof, and the first upper arm 12c can swing in the vertical direction with respect to the lower arm 12b with a horizontal axis (a control axis S shown in FIG. 1) as a center thereof. In addition, the second upper arm 12d can rotate with a central axis of the second upper arm 12d as a center thereof, and the first wrist 12e can swing in the vertical direction with respect to the second upper arm 12d with a horizontal axis as a center thereof. Further, the robot hand 20 can be installed to or removed from a distal end of the second wrist 12f, and the second wrist 12f can rotate with a central axis of the second wrist 12f as a center thereof.

The arm unit 12 is configured such that a height (hereinafter referred to as a "height of a base coordinate origin") from a bottom surface of the workpiece holding robot 10 (in other words, the robot side floor surface FR) to a predetermined reference part can be mechanically fixed or uniquely specified in a calibration processing step to be described late. In the present embodiment, the "height of a base coordinate origin" refers to a linear line length along the vertical direction from the robot side floor surface FR to the control axis S of the first upper arm 12c, but is not limited to this. The reference part can be arbitrarily changed.

Note that since various known configurations can be adopted for the arm unit 12, detailed description thereof will be omitted. Further, the arm unit 12 is not limited to a configuration of the articulated arm including the 6-axis control axis described above, and various known configurations can be arbitrarily adopted.

Figure 2:
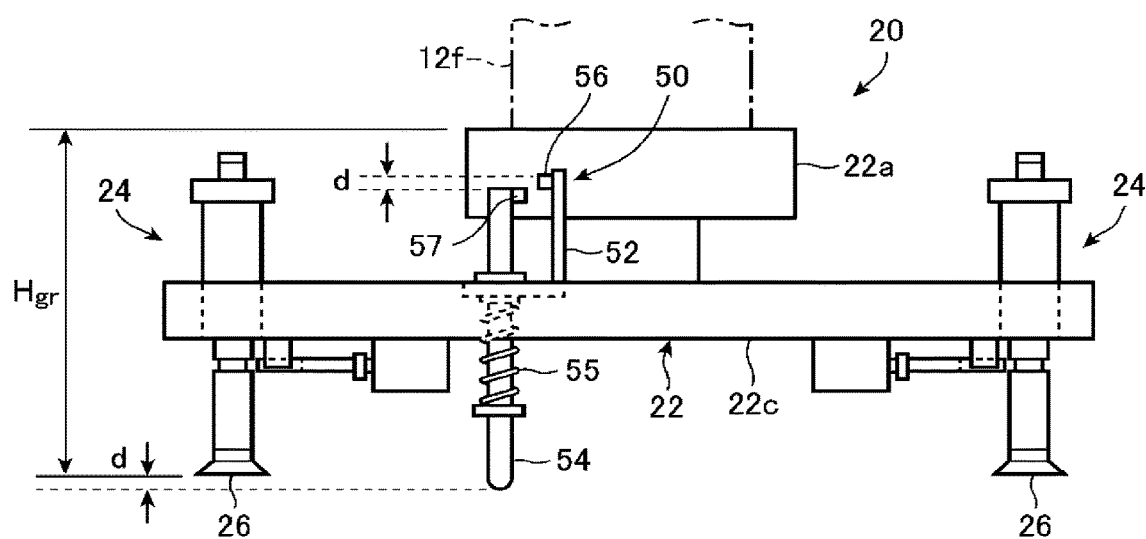
FIG. 2 is a front view schematically showing a robot hand according to the present embodiment.
Figure 3:
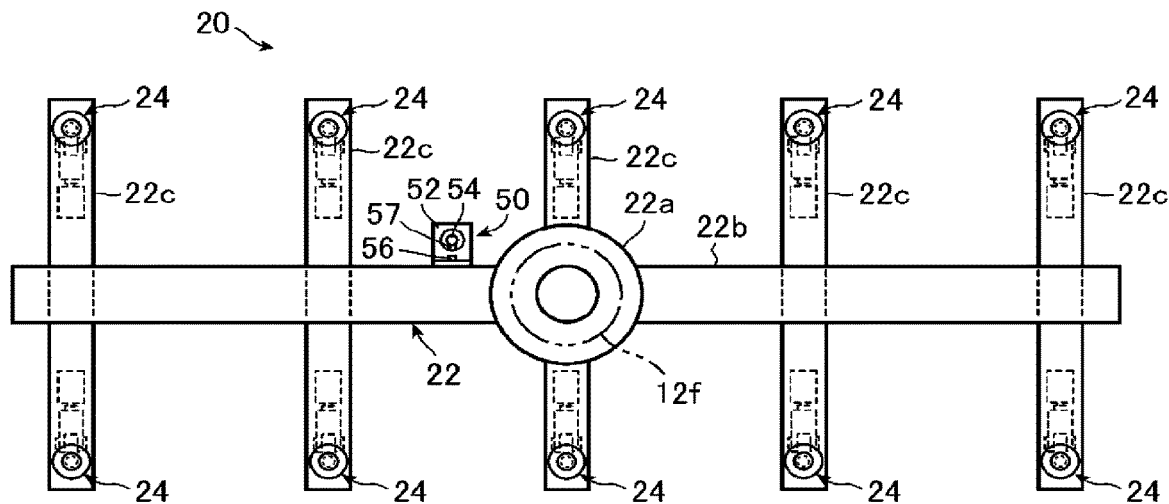
FIG. 3 is a bottom view schematically showing the robot hand according to the present embodiment.

As shown in FIGS. 2 and 3, the robot hand 20 includes a hand main body 22 mounted to a distal end of the second wrist 12f of the arm unit 12 in an installable and removable manner, and a plurality of grippers 24 attached to the hand main body 22 and configured to be able to hold the workpiece W.

The hand main body 22 includes a mounting portion 22a mounted to the distal end of the second wrist 12f of the arm unit 12 in an installable and removable manner, a first support bar 22b coupled to the mounting portion 22a, and a plurality of second support bars 22c provided at intervals to the first support bar 22b in the length direction thereof. Note that the shape of the hand main body 22 is not limited to the illustrated example, and can be arbitrarily changed in accordance with the shape or the like of the workpiece W.

The grippers 24 are respectively attached to both ends of each of the second support bars 22c, and are connected to an air suctioning source (not shown) for suctioning air via a pipe, respectively. Each gripper 24 is provided with, at a lower end thereof, a flat suctioning pad 26 capable of suctioning (capable of contacting) a surface of the workpiece W, and is configured to suction a surface of the uppermost workpiece W from among the plurality of workpieces W loaded in the loading area TA by a suctioning force of the air from the air suctioning source. The air suctioning source is configured to start a suctioning operation when a contact between the robot hand 20 and the workpiece W is detected by the surface detection sensor 50 (specifically, when a dog 57 to be described later is detected by a proximity sensor 56 to be described later).

A height (hereinafter referred to as a "gripper height Hgr") of the robot hand 20 can be mechanically fixed or uniquely specified, and can be specified by, for example, a standard or the like of the robot hand 20. Note that in the present specification, as shown in FIG. 2, the gripper height Hgr is a linear line length along the vertical direction from a base end (an upper end of the mounting portion 22a in the present embodiment) to a distal end (a lower end of the suctioning pad 26 in the present embodiment) of the robot hand 20, and is intended to be a theoretical value of a mechanical height of the robot hand 20 that does not include an error (an offset height Ho to be described later) due to a detection accuracy of the surface detection sensor 50.

Note that since various known configurations can be adopted for the robot hand 20, detailed description thereof will be omitted. Further, the robot hand 20 is not limited to a suctioning method described above, and various known configurations can be arbitrarily adopted.

[Surface Detection Sensor]

As shown in FIGS. 2 and 3, the surface detection sensor 50 is attached to an arbitrary position on the hand main body 22 of the robot hand 20, and is configured to be able to detect that the suctioning pad 26 is brought into contact with the surface of the workpiece W. Note that in the present specification, "being brought into contact with the surface of the workpiece W" includes not only a case of being completely brought into contact with the surface of the workpiece W but also a case of being close enough to be evaluated as being brought into contact with the surface of the workpiece W.

Specifically, the surface detection sensor 50 includes a bracket 52 that is configured to be attachable to the hand main body 22 of the robot hand 20, a contact pin 54 that is brought into contact with the surface of the workpiece W prior to the suctioning pad 26, and the proximity sensor 56 that detects that the contact pin 54 is brought into contact with the surface of the workpiece W.

The bracket 52 is an L-shaped bracket that includes a parallel portion parallel to the first support bar 22b and the second support bar 22c of the hand main body 22, and a perpendicular portion perpendicular to the parallel portion, and is configured to be attachable to the hand main body 22 such that the perpendicular portion extends along an advancing/retreating direction of the contact pin 54. The bracket 52 is configured to be installable to and removable from the first support bar 22b and the second support bar 22c of the hand main body 22. In other words, a position at which the surface detection sensor 50 is attached with respect to the hand main body 22 can be changed in accordance with a position of a hole formed in the workpiece W, a shape and an unevenness of the surface of the workpiece W, and the like so that the contact pin 54 and the suctioning pad 26 can be surely brought into contact with the surface of the workpiece W.

The contact pin 54 is provided so as to penetrate the parallel portion of the bracket 52 such that, with the first support bar 22b and the second support bar 22c of the hand main body 22 as a boundary, a distal end thereof is located on a side that is brought into contact with the workpiece W (a side of the gripper 24 of the hand main body 22) and a proximal end thereof is located on an opposite side thereof (a side of the mounting portion 22a of the hand main body 22).

The contact pin 54 is urged by a coil spring 55 toward a distal end direction thereof (a direction toward the workpiece W), and in a state before contact with the workpiece W (a state in which the coil spring 55 is not compressed), has a length in which the distal end thereof is located on a side closer to the workpiece W than the suctioning pad 26 of the gripper 24. Further, the contact pin 54 is configured to be retreated to the proximal end side when the coil spring 55 is compressed by the contact with the workpiece W.

The dog 57 that can be detected by the proximity sensor 56 is provided at the proximal end of the contact pin 54. The dog 57 is located at a position in which the dog 57 cannot not be detected by the proximity sensor 56 in a state before the contact pin 54 is brought into contact with the workpiece W (the state in which the coil spring 55 is not compressed), and can be detected by the proximity sensor 56 in a state in which the contact pin 54 is brought into contact with the workpiece W and is retreated toward the proximal end side by a predetermined amount d (see FIG. 2) (a state in which the coil spring is compressed).

The proximity sensor 56 is provided to the perpendicular portion of the bracket 52 and is configured to detect the dog 57 of the contact pin 54 when the contact pin 54 is brought into contact with the workpiece W and is retreated to the proximal end side by the predetermined amount d. In other words, the surface detection sensor 50 according to the present embodiment is configured such that the dog 57 is detected by the proximity sensor 56 when the distal end of the contact pin 54 is brought into contact with the surface of the workpiece W mounted on the mounting pedestal P, and the contact pin 54 is retreated to the proximal end side (upward) by the predetermined amount d while resisting an urging force of the coil spring 55, and is configured to be able to detect that the suctioning pad 26 is brought into contact with the surface of the workpiece W when the dog 57 is detected.

Note that the surface detection sensor 50 is not limited to the configuration described above, and as long as the surface detection sensor 50 is configured to be able to detect that the robot hand 20 is brought into contact with the workpiece W, it is possible to arbitrarily adopt various known configurations including a non-contact type sensor, an inner force sensor of the workpiece holding robot 10, and the like.

[Robot Control Unit]

The robot control unit 60 is configured to control the moving mechanism 14 and the arm unit 12 so that the robot hand 20 reaches the uppermost workpiece W from among the plurality of workpieces W loaded in the loading area TA based on information on a position (x, y) and a loading height (h) of the workpiece W that are supplied from an image processor 32, which will be described later, of the camera system 30. Further, the robot control unit 60 is configured to control the air suctioning source so that the uppermost workpiece W is held by the robot hand 20, and also to control the moving mechanism 14 and the arm unit 12 so as to transport the held workpiece W toward the transport destination such as the working machine when the robot hand 20 reaches the uppermost workpiece W and the contact between the robot hand 20 and the uppermost workpiece W is detected by the surface detection sensor 50.

Further, the robot control unit 60 includes an offset height measurement unit 62 that detects a height measurement error (the offset height Ho) of the robot hand 20 (the workpiece holding portion) due to the detection accuracy of the surface detection sensor 50. Further, the robot control unit 60 is configured to be able to transmit, to the camera system 30, the offset height Ho detected by the offset height measurement unit 62 in an offset height measurement processing step that will be described later, and is also configured to be able to sequentially transmit, to the camera system 30, a hand end height Ht (the "hand end height Ht when a bottom surface (the mounting pedestal floor side surface FP) of the mounting pedestal P is used as a reference", which will be described later) when the surface of the workpiece W is detected by the surface detection sensor in a workpiece transport processing step that will be described later. Hereinafter, a specific configuration of the offset height measurement unit 62 will be described.

As shown in FIG. 4, in the calibration processing step to be described later, the offset height measurement unit 62 is configured to detect the "mounting pedestal height Hp" based on a "height Hj of a calibration jig CJ" mounted on the mounting pedestal P, a "height Hgr of a calibration gripper CG" mounted on the arm unit 12 in lieu of the robot hand 20 (the workpiece holding portion), the height from the robot side floor surface FR to the predetermined reference part of the workpiece holding robot 10 (the height of a base coordinate origin) at a point in time at which the calibration gripper CG is brought into contact with the calibration jig CJ, and a height (the hand end height Hbt when the base coordinate origin is used as a reference) from the reference part to a connection point between the calibration gripper CG and the arm unit 12 at the same point in time. In other words, with respect to the "height of a base coordinate origin", a following calculation formula (1) is established as shown in FIG. 4, but by re-arranging this formula to a following calculation formula (2), the "mounting pedestal height Hp" can be uniquely calculated.

[Calculation Formula (1)]

$$\text{"Height of base coordinate origin"} = Hp + Hj + Hgr + Hbt$$

[Calculation Formula (2)]

$$Hp = \text{"Height of base coordinate origin"} - Hj - Hgr - Hbt$$

Note that the calibration jig CJ is a plate-shaped member used in the calibration processing step to be described later, and is configured such that the height Hj thereof (a thickness) can be uniquely specified. Further, the calibration gripper CG is a robot hand dedicated to calibration used in the calibration processing step to be described later, and is configured such that the height Hgr thereof can be uniquely specified as adjustment of the surface detection sensor is not possible.

Further, in the calculation formulas (1) and (2) described above, the "hand end height Hbt when a base coordinate origin is used as a reference" is a linear line length along the vertical direction from the base coordinate origin to the base end of the robot hand 20 (the upper end of the mounting portion 22*a* in the present embodiment) at a time of contact between the calibration gripper CG and the calibration jig CJ, which can be mechanically fixed or uniquely specified.

Figure 5:
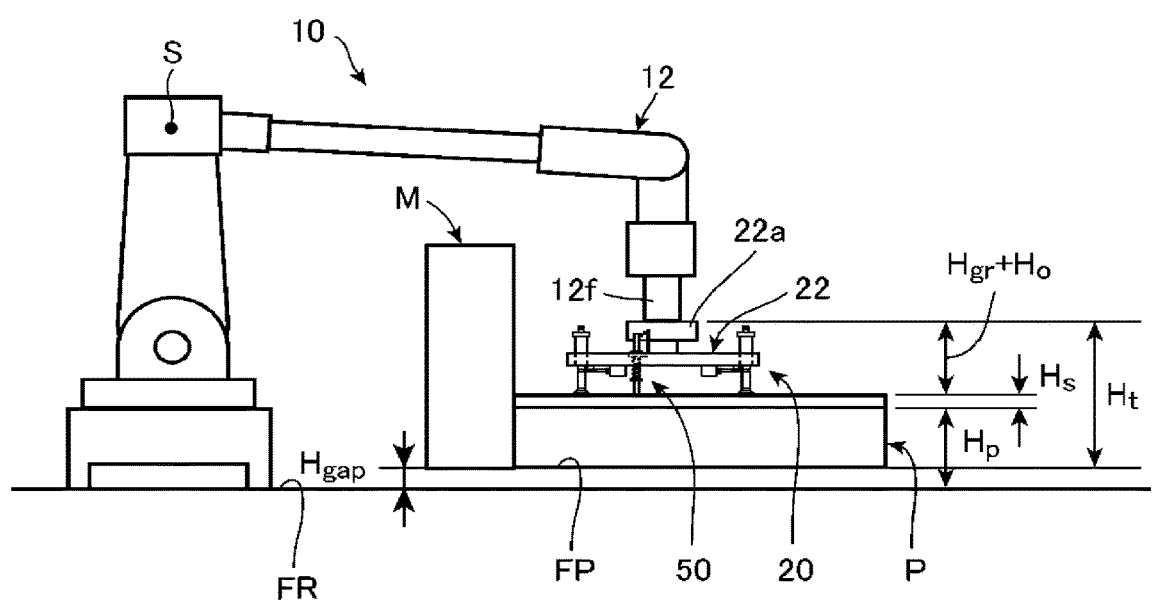
FIG. 5 is a schematic diagram showing height relations among the respective configurations at the time of offset height measurement processing.

Further, as shown in FIG. 5, in the offset height measurement processing step to be described later, the offset height measurement unit 62 is configured to detect the height error (the offset height Ho) of the robot hand 20 (the workpiece holding portion) based on the height (the hand end height Ht when the bottom surface (the mounting pedestal side floor surface FP) of the mounting pedestal P is used as a reference) from the mounting pedestal side floor surface FP to a connection point (the upper end of the mounting portion 22*a* in the present embodiment) between the robot hand 20 (the workpiece holding portion) and the arm unit 12 at the point in time at which contact with the workpiece W (the detection target) is detected by the surface detection sensor 50, a height (the "detection target height Hs"+ the "mounting pedestal height Hp"−"the floor surface height gap Hgap") from the mounting pedestal side floor surface FP to the surface of the workpiece W (the detection target), and the theoretical value of the height (the gripper height Hgr) of the robot hand 20 (the workpiece holding portion).

Here, the height from the mounting pedestal side floor surface FP to the surface of the workpiece W (the detection target) includes the height from the mounting pedestal side floor surface FP to the surface of the mounting pedestal P (the "mounting pedestal height Hp"− the "floor surface height gap Hgap"), and a height (a detection target height Hs) of the workpiece W (the detection target) mounted on the mounting pedestal P. Further, the height from the mounting pedestal side floor surface FP to the surface of the mounting pedestal P includes the mounting pedestal height (the mounting pedestal height Hp) from the robot side floor surface FR to the surface of the mounting pedestal P, and the height gap between the mounting pedestal side floor surface FP and the robot side floor surface FR (the floor surface height gap Hgap), and can be detected based on these mounting pedestal height Hp and floor surface height gap Hgap.

Specifically, the offset height measurement unit 62 is configured to specify the "offset height Ho" based on the "hand end height Ht when the bottom surface (the mounting pedestal side floor surface FP) of the mounting pedestal P is used as a reference", the "floor surface height gap Hgap", the "mounting pedestal height Hp", the "detection target height Hs", and the "gripper height Hgr".

In other words, as shown in FIG. 5, with respect to the "hand end height Ht when the bottom surface (the mounting pedestal side floor surface FP) of the mounting pedestal P is used as a reference", a following calculation formula (3) should be theoretically established. However, the present inventor has discovered that there are cases in which the following calculation formula (3) is not established when actually measured, and as a result of diligent studies, has found that this is caused by mechanical factors such as adjustment or change of an attachment position of the surface detection sensor 50 by a user, or a deflection and a height gap of the hand main body 22 to which the surface detection sensor 50 is attached, for example. Therefore, the present inventor has amended the following calculation formula (3) to a following calculation formula (4) in consideration of the error (the offset height Ho) caused by the detection accuracy of the surface detection sensor 50, and has re-arranged the following calculation formula (4) to a following calculation formula (5) so as to uniquely calculate the "offset height Ho".

[Calculation Formula (3)]

$$Ht=(Hp-Hgap)+Hs+Hgr$$

[Calculation Formula (4)]

$$Ht=(Hp-Hgap)+Hs+(Hgr+Ho)$$

[Calculation Formula (5)]

$$Ho=Ht-Hp+Hgap-Hs-Hgr$$

Note that in the calculation formulas (3) to (5) described above, the "hand end height Ht when the bottom surface (the mounting pedestal side floor surface FP) of the mounting pedestal P is used as a reference" is a linear line length along the vertical direction from the bottom surface of the mounting pedestal P (the mounting pedestal side floor surface FP) to the base end (the upper end of the mounting portion 22*a* in the present embodiment) of the robot hand 20 when the workpiece surface is detected by the surface detection sensor 50, which can be mechanically fixed or uniquely specified.

Further, in the calculation formulas (3) to (5) described above, the "detection target height Hs" is a linear line length along the vertical direction from the upper surface of the mounting pedestal P to a surface of a part with which the robot hand 20 is brought into contact (a surface detected by the surface detection sensor 50). In other words, when the robot hand 20 is brought into contact with the workpiece W, a thickness of the workpiece W mounted on the mounting pedestal P is the "detection target height Hs". When only one sheet of the workpiece W is mounted on the mounting pedestal P, for example, the "detection target height Hs" is a thickness of the workpiece W for one sheet. When the plurality of workpieces W are mounted on the mounting pedestal P, the "detection target height Hs" is a total value of the thickness of the plurality of workpieces W. Note that the "detection target height Hs" can be input by the user via an offset height registration screen 70 (see FIG. 8), which will be described later.

Further, in the calculation formulas (4) and (5) described above, the "offset height Ho" is the error caused by the detection accuracy of the surface detection sensor 50, and more specifically, a gap ($\Delta d=d-d'$) in a detected distance from an original detected distance (the predetermined amount d) between the proximity sensor 56 and the dog 57, to an actual detected distance d'(not shown) generated due to the mechanical factors relating to the surface detection sensor 50, which are described above.

[Configuration of Camera System]

Figure 6:
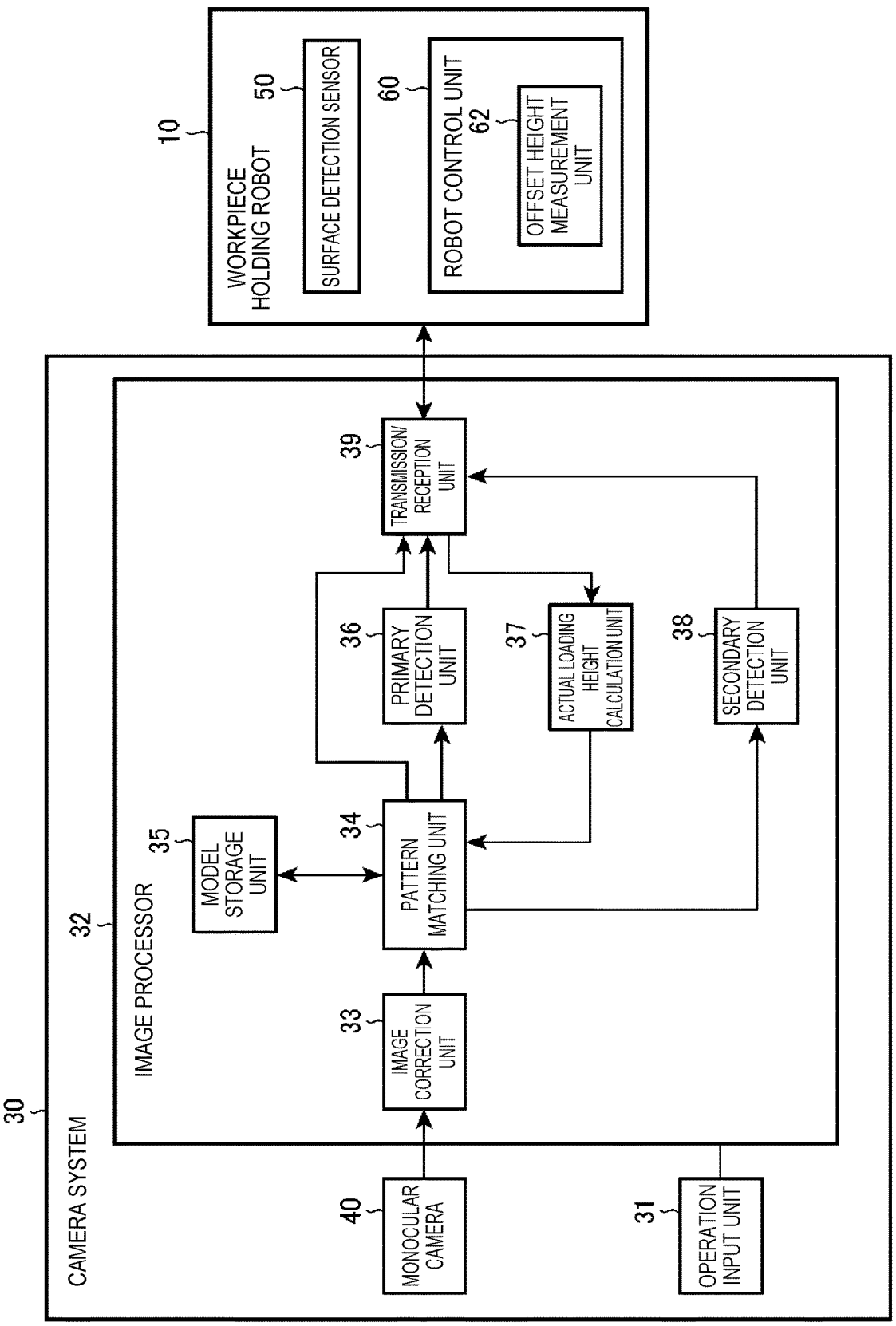
FIG. 6 is a block diagram schematically showing functional configurations in a camera system and a workpiece holding robot according to the present embodiment.

As shown in FIGS. 1 and 6, the camera system 30 includes a camera 40 capable of photographing the workpiece W mounted on the mounting pedestal P, the image processor 32 for detecting the position and the loading height of the workpiece W based on the photographed image of the workpiece W photographed by the camera 40, and an operation input unit 31 for inputting information, setting, and the like by an operator.

[Camera]

The camera 40 is composed of, for example, an inexpensive and highly versatile monocular camera (in other words, a camera to which one lens and one image sensor are arranged), and as shown in FIG. 1, is arranged on an upper part of the loading area TA of the mounting pedestal P via a support member such as a camera stand 41 so that the entire or a part of the loading area TA can be photographed as a photographed range.

In the present embodiment, as shown in FIG. 1, the camera 40 is arranged at a position that does not interfere with the workpiece holding robot 10, for example, a position away from directly above a center of the mounting pedestal P in a direction away from the workpiece holding robot 10 (at an obliquely above position of the mounting pedestal P), and is configured to photograph the loading area TA and the workpiece W of the mounting pedestal P from obliquely above. In the present embodiment, by arranging the camera 40 at the obliquely above position of the mounting pedestal P in this manner, it is possible to reduce a risk of interference by the camera 40 when the workpiece W is carried in on the mounting pedestal P by using a crane or the like, or when the workpiece W is transported by the workpiece holding robot 10.

The camera 40 is configured to supply photographed image data to the image processor 32. Note that the camera system 30 according to the present embodiment may be configured to directly output a digital signal (the photographed image data) from the camera 40, or may be configured to convert an analog signal (a photographed image signal), which is output from the camera 40, into the digital signal (the photographed image data) with an A/D converter (not shown) or the like for outputting.

Further, the camera 40 is configured to be interlockable with a lighting facility L such that the workpiece W loaded on the mounting pedestal P is irradiated with an illumination beam when the workpiece W is photographed. According to such a configuration, there is an advantage that an edge of the workpiece W is clarified, which makes it easier to detect the position of the workpiece W when the position of the workpiece W is detected by pattern-matching to be described later.

[Image Processor]

The image processor 32 is configured to detect a position and a loading height of the uppermost workpiece W from among the plurality of workpieces W loaded in the loading area TA based on the photographed image data supplied from the camera 40, and to supply information on the detected position and loading height to the robot control unit 60. In other words, the image processor 32 is configured to be able to function as a workpiece detection device that detects, with high accuracy, the position and the loading height of the uppermost workpiece W from among the plurality of workpieces W loaded in the loading area TA.

Specifically, as shown in FIG. 6, the image processor 32 includes an image correction unit 33 that corrects the photographed image data supplied from the camera 40, a model storage unit 35 that stores a plurality of sheets of models of the workpiece W, a pattern matching unit 34 that executes the pattern matching between an image of the photographed image data that is corrected and the model of the workpiece W stored in the model storage unit 35, a primary detection unit 36 that detects the position and the height of the workpiece W based on a result of first pattern matching processing, which will be described later, of the pattern matching unit 34, an actual loading height calculation unit 37 that calculates the actual loading height Hw of the workpiece W loaded in the loading area TA based on a surface detection by the surface detection sensor 50, a secondary detection unit 38 that re-detects the position and the height of the workpiece W based on a result of second pattern matching processing, which will be described later, of the pattern matching unit 34, and a transmission/reception unit 39 that performs data communication to and from the workpiece holding robot 10.

The image correction unit 33 is configured to correct the photographed image data by using a conversion parameter obtained based on the calibration processing executed in advance. Specifically, the image correction unit 33 is configured to execute conversion processing (image correction) for returning the photographed image photographed from obliquely above to an original shape of the workpiece W (in other words, the shape of the workpiece W when photographed from directly above). Note that since such image correction can be executed by various arbitrary methods, detailed description thereof will be omitted.

A plurality of the models having different sizes are stored in the model storage unit 35. Specifically, the model storage unit 35 stores the models having a plurality of stages of sizes from a model corresponding to a photographed image (a photographed image of a minimum number of workpiece W) in a state in which one sheet of workpiece W is arranged in the loading area TA to a model corresponding to a photographed image (a photographed image of a maximum number of workpieces W) in a state in which a maximum number of sheets of workpieces W are loaded in the loading area TA. The model can be a linear image having the same shape as the workpiece W to be transported (the workpiece W loaded in the loading area TA of the mounting pedestal P).

Note that it is preferable that the plurality of models having different angles for each size of the model are further stored in the model storage unit 35, whereby not only the position of the workpiece W but also the angle (an orientation) of the workpiece W can be specified. It is preferable that the angles of the models in this case differ by 1 degree (in other words, 360 models each having a different angle by 1 degree for each size of the model are prepared).

The pattern matching unit 34 is configured to be able to execute first pattern matching processing for pattern-matching the image of the photographed image data corrected by the image correction unit 33 with all the models stored in the model storage unit 35, and is configured to select, by way of the first pattern matching processing, a model having a size (and an angle) with the highest degree of matching.

The primary detection unit 36 is configured to detect a planar position (x, y) (and an angle (θ)) of the uppermost workpiece W actually loaded in the loading area TA and the loading height (h) of the workpiece W based on the model having the size (and the angle) with the highest degree of matching, which is selected by the first pattern matching processing of the pattern matching unit 34.

Specifically, the primary detection unit 36 is configured to detect a position of a corner portion (x, y) of the selected model as the position of the uppermost workpiece W on the loading area TA, and is configured to detect the angle (θ) of the selected model as the angle of the uppermost workpiece W on the loading area TA when the angle (θ) of the workpiece W is also detected. Note that the origin (0, 0) of the photographed image can be the position of the corner portion of the loading area TA. Further, the primary detection unit 36 is configured to detect the height of the workpiece W actually loaded in the loading area TA (in other words, a linear line length along the vertical direction from an upper surface of the loading area TA to an upper surface of the uppermost workpiece W) based on the size of the matched model. Note that a correspondence between the size of the photographed image of the workpiece W and the size of the model can be determined in advance by the calibration processing or the like.

The actual loading height calculation unit 37 is configured to detect the actual loading height Hw of the workpiece W mounted on the mounting pedestal P in consideration of the height error (the offset height Ho) of the robot hand 20 (the workpiece holding portion). Specifically, the actual loading height calculation unit 37 is configured to calculate the "actual loading height Hw" of the workpiece W mounted on the loading area TA by a following calculation formula (6) based on the "hand end height Ht when the bottom surface (the mounting pedestal side floor surface FP) of the mounting pedestal P is used as a reference" (the height from the mounting pedestal side floor surface FP to the connection point between the robot hand 20 (the workpiece holding portion) and the arm unit 12) received from the robot control unit 60, the "offset height Ho" (the height error of the robot hand 20 (the workpiece holding portion)) also received from the robot control unit 60, the height from the mounting pedestal side floor surface FP to the surface of the mounting pedestal P (the "mounting pedestal height Hp"– the "floor surface height gap Hgap"), and the theoretical value of the "gripper height Hgr" of the robot hand 20 (the workpiece holding portion).

[Calculation Formula (6)]

$$Hw=Ht-Hp+Hgap-Hgr-Ho$$

Further, the pattern matching unit 34 is configured to be able to execute the second pattern matching processing that narrows down a range of the models to be pattern-matched based on the actual loading height Hw detected by the actual loading height calculation unit 37, and then pattern-matches the image of the photographed image data, which is corrected by the image correction unit 33, with the model within the narrowed-down range, and is configured to re-select the model having the size (and the angle) with the highest degree of matching by way of the second pattern matching processing more accurately than the first pattern matching processing. Note that the pattern matching unit 34 may be configured to create a new model having a size based on the actual loading height Hw in lieu of selecting a part of the models based on the actual loading height Hw.

The secondary detection unit 38 is configured to re-detect the planar position (x, y) (and the angle (θ)) of the uppermost workpiece W actually loaded in the loading area TA and the loading height (h) of the workpiece W based on the model having the size (and the angle) with the highest degree of matching, which is selected by the second pattern matching processing of the pattern matching unit 34.

[Operation Input Unit]

As shown in FIG. 1, the operation input unit 31 includes a display as a display device and an input unit consisting of input devices such as a keyboard and a mouse, and is configured to be able to display an offset height registration screen 70, which will be described later, on the display in addition to a function of displaying a screen and inputting information typically required for the workpiece transport system 1. Note that the operation input unit 31 is not limited to a configuration provided with the display and the input unit, and is not limited to this as long as it can be provided with the equivalent function (for example, display means, input means, and the like that can be remotely used in lieu of the display and the input unit.

[Workpiece Transport Method]

Next, a workpiece transport method performed by using the workpiece transport system 1 according to the present embodiment will be described. The workpiece transport method according to the present embodiment is a workpiece transport method in which the workpiece W mounted on the mounting pedestal P is transported (carried out) from the mounting pedestal P by the workpiece holding robot 10, and generally includes the calibration processing step (a preprocessing step) for acquiring the theoretical value of the height of the mounting pedestal P (the mounting pedestal height Hp), the offset height measurement processing step for specifying the error (the offset height Ho) due to the detection accuracy of the surface detection sensor 50, and the workpiece transport processing step for executing transport processing of the workpiece W by the workpiece holding robot 10.

[Calibration Processing Step (Preprocessing Step)]

In the workpiece transport method according to the present embodiment, the calibration processing step is first executed prior to the workpiece transport processing step. The calibration processing step is calibration processing that is typically performed only once when a mechanical system is delivered. In the calibration processing step, the calibration jig CJ, which is given an opening, an AR marker, or the like that is a characteristic point, is held by the workpiece holding robot 10 and photographed by the camera 40 while being moved and rotated along the horizontal direction and the vertical direction in a space of the loading area TA of the mounting pedestal P. Then, based on the photographed image taken in this manner and information such as a position coordinate of the workpiece holding robot 10, a spatial coordinate in the loading area TA of the mounting pedestal P is specified. Note that the calibration processing step may be performed at various arbitrary timings such as when the height of the mounting pedestal P is changed in addition to or in lieu of the time at which the mechanical system is delivered.

In the workpiece transport method according to the present embodiment, the mounting pedestal height Hp is specified by using this calibration processing step. Specifically, in this calibration processing step, by using the calibration jig CJ having the invariant height Hj (thickness) and the calibration gripper CG having the invariant height Hgr, the theoretical value of the height (the mounting pedestal height Hp) of the mounting pedestal P is acquired in accordance with the calculation formula (2) mentioned previously. Further, in this calibration processing step, the floor surface height gap Hgap is also specified (calculated).

Further, in the workpiece transport method according to the present embodiment, in this calibration processing step, processing of generating the conversion parameter for the image correction is also executed by performing image analysis based on information such as a distortion of the photographed image and a spatial coordinate value of the photographed image at the time of photography.

[Offset Height Measurement Processing Step]

Next, in the workpiece transport method according to the present embodiment, the offset height measurement processing step is executed prior to or in parallel to the workpiece transport processing step. The offset height measurement processing step is generally a step to execute processing of detecting the height error (the offset height Ho) of the robot hand 20 (the workpiece holding portion) based on the height (the hand end height Ht when the bottom surface (the mounting pedestal side floor surface FP) is used as a reference) of the mounting pedestal P from the mounting pedestal side floor surface FP to the connection point (the upper end of the mounting portion 22a in the present embodiment) between the robot hand 20 (the workpiece holding portion) and the arm unit 12 at the time when the contact with the workpiece W (the detection target) is detected by the surface detection sensor 50, the height from the mounting pedestal side floor surface FP to the surface of the workpiece W (the detection target) (the "detection target height Hs"+ the "mounting pedestal height Hp"– the "floor surface height gap Hgap"), and the theoretical value (the gripper height Hgr) of the height of the robot hand 20 (the workpiece holding portion).

Figure 7:
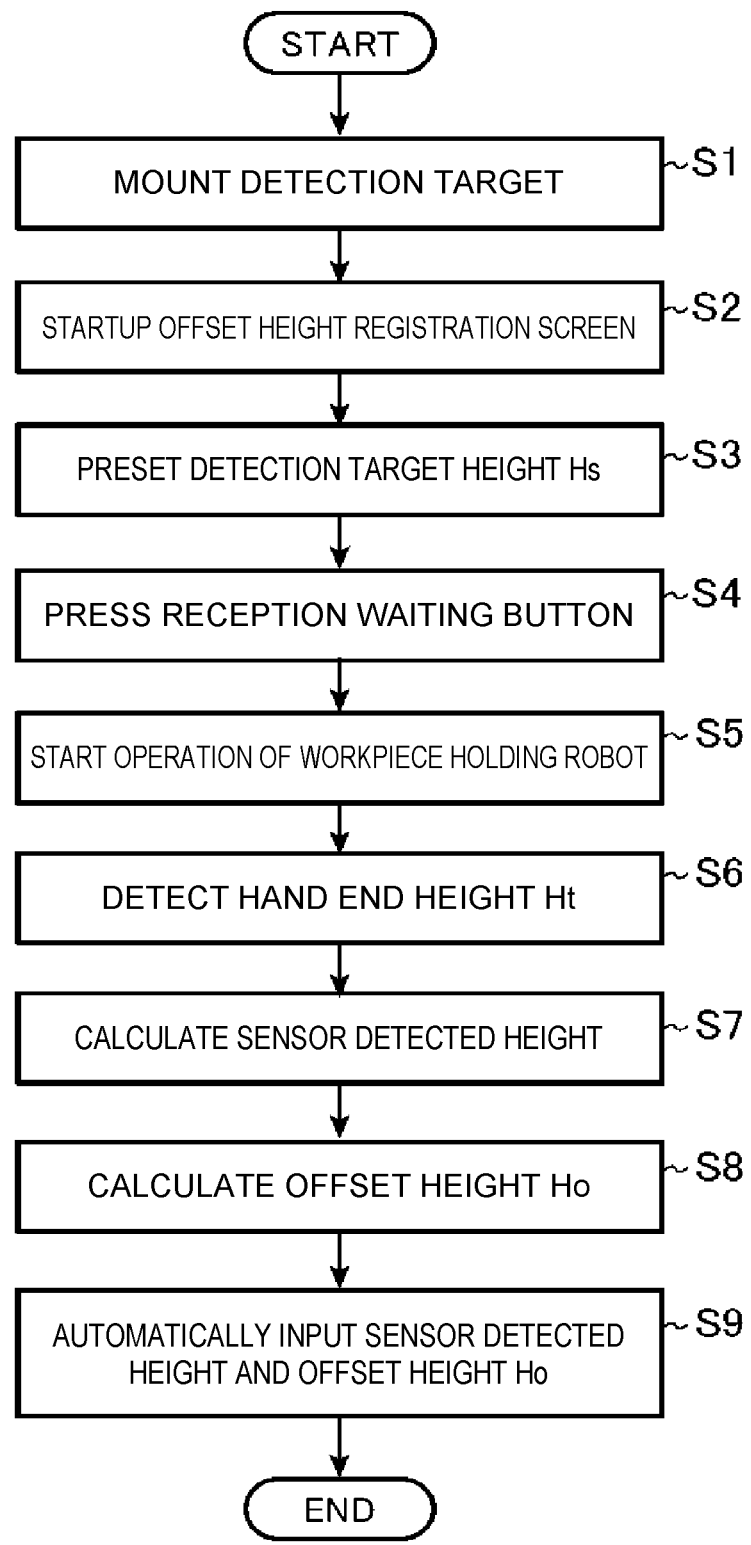
FIG. 7 is a flowchart showing a flow of an offset height measurement processing step of a workpiece transport method according to the present embodiment.

Specifically, as shown in FIG. 7, in the offset height measurement processing step, the detection target in which the detection target height Hs is uniquely specified is first mounted on the loading area TA of the mounting pedestal P in which the mounting pedestal height Hp is uniquely specified in the calibration processing step (S1). At this time, it is preferable that the detection target is mounted such that the corner portion thereof is aligned with the corner portion (origin (0, 0)) of the loading area TA of the mounting pedestal P. As the detection target, it is possible to use, for example, one sheet of workpiece W whose thickness is specified in advance, but the detection target is not limited to this.

Figure 8:
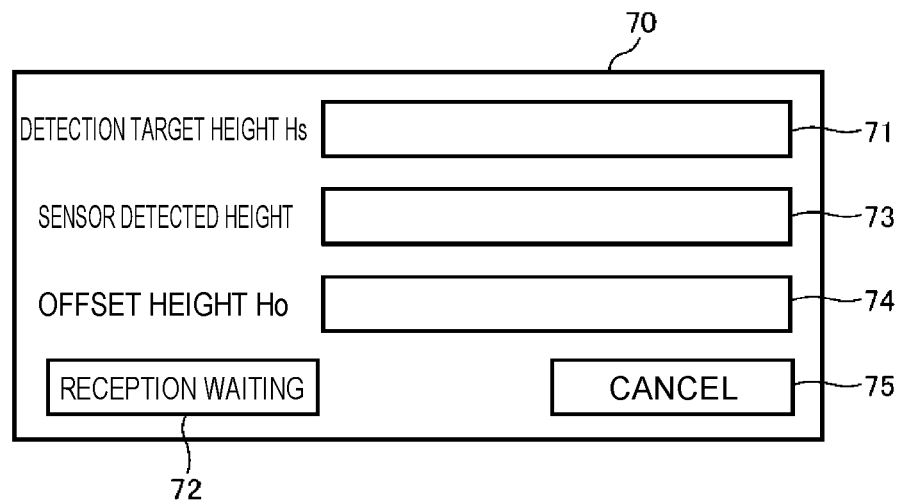
FIG. 8 is a screen view showing an example of an offset height registration screen according to the present embodiment.

Next, the offset height registration screen 70 is started up on the display of the operation input unit 31 of the camera system 30 by an operation of the user (S2). As shown in FIG. 8, the offset height registration screen 70 includes a detection target height display field 71 in which the theoretical value of the detection target height Hs is displayed, a sensor detected height display field 73 in which the sensor detected height of the detection target actually measured by using the surface detection sensor 50 is displayed, an offset height display field 74 in which the offset height Ho is displayed, a reception waiting button 72 that accepts a start operation of the offset height measurement processing, and a cancel button 75 that accepts a cancel operation of the offset height measurement processing.

Here, the theoretical value (in the present embodiment, a thickness of one sheet of the workpiece W to be processed) of the detection target height Hs, which is registered in advance, is preset and displayed by default in the detection target height display field 71 (S3). The detection target height display field 71 is configured such that the theoretical value displayed by default can be arbitrarily changed by an input operation of the user. This makes it possible to use, for example, a detection target having a detection target height Hs that is different from the theoretical value of the detection target height Hs that is registered in advance. Further, even when a mounting pedestal P, which is other than the mounting pedestal P for which the mounting pedestal height Hp is specified in the calibration processing step, is used, for example, it is possible to add or subtract, to or from the theoretical value of the detection target height Hs, a height displacement value prior to and after that (a displacement value between the mounting pedestal height Hp of the mounting pedestal P used in the calibration processing step and the mounting pedestal height Hp of the mounting pedestal P used in the offset height measurement processing step) so as to arbitrarily input the value in the detection target height display field 71.

Next, when the reception waiting button 72 of the offset height registration screen 70 is pressed by the user (S4), the workpiece holding robot 10 starts an operation toward the detection target (the workpiece W) mounted in the loading area TA (S5). Then, by detecting the contact between the robot hand 20 and the detection target (the workpiece W) with the surface detection sensor 50, the previously mentioned "hand end height Ht when the bottom surface (the mounting pedestal side floor surface FP) of the mounting pedestal P is used as a reference" is detected (S6).

After that, the robot control unit 60 calculates the sensor detected height (the "detection target height Hs" including the "offset height Ho") of the detection target by a following calculation formula (7) based on the detected hand end height Ht, the "mounting pedestal height Hp" and the "floor surface height gap Hgap" specified in the calibration processing step, and the theoretical value of the "gripper height Hgr" of the robot hand 20 (S7). Further, the robot control unit 60 calculates the "offset height Ho" by subtracting the detection target height Hs, which is input to the detection target height display field 71, from the sensor detected height (S8).

[Calculation Formula (7)]

$$\text{Sensor detected height } (Hs+Ho)=Ht-Hp+Hgap-Hgr$$

Then, the calculated sensor detected height and offset height Ho are automatically input to the sensor detected height display field 73 and the offset height display field 74 of the offset height registration screen 70, respectively (S8), and a series of processing of the offset height measurement processing step is put to an end.

Note that in the workpiece transport method according to the present embodiment, it is possible to perform the offset height measurement processing step described above once for each one type of the workpiece W by utilizing a timing of a checking operation typically performed by the user when a new workpiece is started up. However, the present invention is not limited to this, and the offset height measurement processing step can be performed any number of times at any timing.

[Workpiece Transport Processing Step]

Then, in the workpiece transport method according to the present embodiment, the workpiece transport processing step is executed after the calibration processing step is executed and after or in parallel to the offset height measurement processing step. Note that in the following description, it is assumed that the planar position of the workpiece W and the loading height of the workpiece W are detected, but the present invention is not limited to this, and information such as the angle of the workpiece W may also be detected in addition to the planar position and the loading height of the workpiece W.

Figure 9:
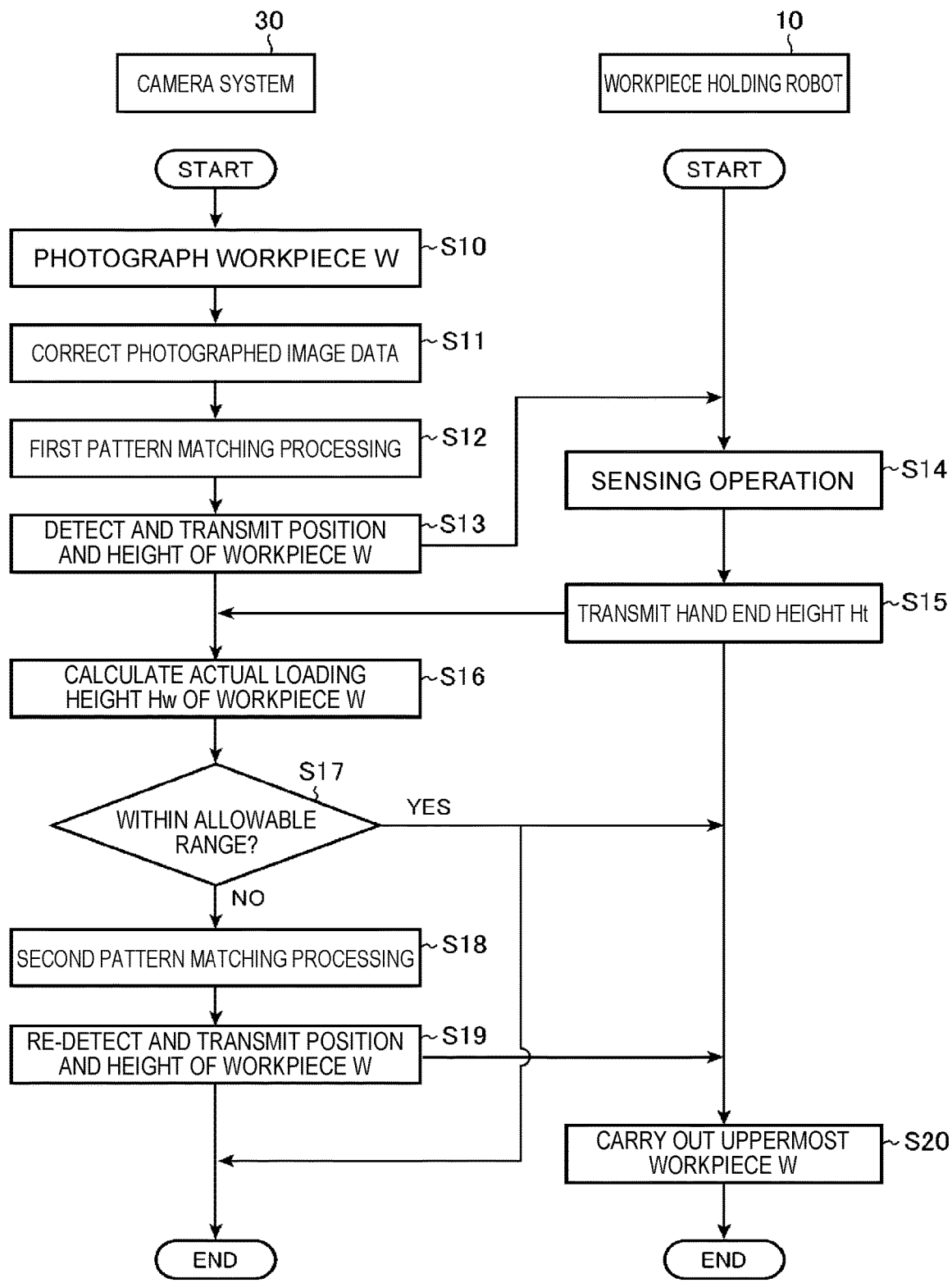
FIG. 9 is a flowchart showing a flow of a workpiece transport processing step of the workpiece transport method according to the present embodiment.

In the workpiece transport processing step, as shown in FIG. 9, the workpiece W mounted on the loading area TA of the mounting pedestal P is first photographed by the camera 40 (S10), and the photographed image data is transmitted to the image processor 32. When the image processor 32 receives the photographed image data from the camera 40, the image processor 32 corrects the photographed image data (S11).

Further, the image processor 32 executes the first pattern matching processing for pattern-matching the image of the photographed image data that is corrected with all the models stored in the model storage unit 35, and selects the model having the highest degree of matching (S12). Note that in this first pattern matching processing, if the corresponding model does not exist due to a reason that the workpiece W to be transported is not mounted on the loading area TA or the like, for example, a determination that the workpiece W cannot be detected (non-detection) is made, and the workpiece transport processing step is put to an end (not shown).

Then, the image processor 32 detects the planar position (x, y) of the uppermost workpiece W actually loaded in the loading area TA and the loading height (h) of the workpiece W based on the model having the highest degree of matching that is selected by the first pattern matching processing, and also transmits these pieces of information to the workpiece holding robot 10 (S13).

When the workpiece holding robot 10 receives the information (x, y, h) relating to the position and the loading height of the workpiece W from the camera system 30, the workpiece holding robot 10 executes a sensing operation in which the robot hand 20 is brought close to the workpiece W based on these pieces of information (S14). Then, when the contact with the uppermost workpiece W loaded in the loading area TA is detected by the surface detection sensor 50, the workpiece holding robot 10 transmits, to the image processor 32 of the camera system 30, the "hand end height Ht when the bottom surface (the mounting pedestal side floor surface FP) of the mounting pedestal P is used as a reference" at a point in time of the contact (S15).

When the image processor 32 receives the hand end height Ht from the workpiece holding robot 10, the image processor 32 calculates the "actual loading height Hw" of the workpiece W by the calculation formula (6) previously mentioned based on the hand end height Ht, the "mounting pedestal height Hp" and the "floor surface height gap Hgap" specified in the calibration processing step, the theoretical value of the "gripper height Hgr" of the robot hand 20, and the "offset height Ho" specified in the offset height measurement processing step (S16). In this manner, in the workpiece transport processing step according to the present embodiment, since the "actual loading height Hw" of the workpiece W mounted on the mounting pedestal P is detected in consideration of the "offset height Ho" (the height error of the robot hand 20 (the workpiece holding portion)), it is possible to calculate the "actual loading height Hw" of the workpiece W with high accuracy by eliminating the error (the error caused by the detection accuracy of the surface detection sensor 50) caused by the mechanical factors such as the adjustment or the change of the attachment position of the surface detection sensor 50 by the user, or the deflection and the height gap of the hand main body 22 to which the surface detection sensor 50 is attached, for example.

Then, the image processor 32 compares the loading height (h) of the workpiece W detected by the first pattern matching processing and the "actual loading height Hw" actually detected by the sensing operation of the workpiece holding robot 10, and then determines whether or not a displacement Δh (Δh=h−Hw) between these heights is within an allowable range (S17). Note that the allowable range in this case can be arbitrarily set, and can be set to, for example, about 3 mm.

In the determination, if the displacement Δh between these heights is within the allowable range (YES in S17), it is determined that there is no abnormality in the loading height (h) of the workpiece W detected by the first pattern matching processing of the camera system 30, and the workpiece holding robot 10 executes the transport processing for the uppermost workpiece W by using the position (x, y) and the loading height (h) of the workpiece W detected by the first pattern matching processing (S20). Then, the transport processing of the camera system 30 and the workpiece holding robot 10 for the uppermost workpiece W is put to an end, and the processing is now moved to the transport processing for the workpiece W to be located at the uppermost portion.

On the other hand, in the determination, if it is determined that the displacement Δh between these heights is out of the allowable range (NO in S17), it is determined that there is an abnormality in the loading height (h) of the workpiece W detected by the first pattern matching processing of the camera system 30, and the second pattern matching processing with higher detection accuracy than the first pattern matching processing is executed (S18).

In other words, since the loading height (h) of the workpiece W detected by the first pattern matching processing is detected based on the photographed image of the workpiece W, the actual loading height may not be necessarily detected with accuracy. Particularly, in the photographed image photographed from an oblique direction, the impact on the detection accuracy of the planar position (x, y) caused by the detection error of the loading height (h) is higher than that in the photographed image photographed from directly above. Therefore, in the workpiece transport processing step according to the present embodiment, when it is determined that the displacement Δh between the heights is out of the allowable range, the second pattern matching processing is executed in which the range of the models to be pattern-matched is more narrowed down than the first pattern matching processing, so as to execute the processing in which the planar position (x, y) and the loading height (h) of the workpiece W are more accurately re-detected.

When the processing is moved to the second pattern matching processing, the image processor 32 first selects a part of the models based on the "actual loading height Hw" actually detected by the sensing operation of the workpiece holding robot 10, from among the models of all sizes for detecting the workpiece W, which are stored in the model storage unit 35. The selection range in this case can be set to, for example, a range from a height obtained by adding the error to the actual loading height Hw to a height obtained by subtracting the error from the actual loading height Hw, and the error in this case can be the thickness of the workpiece W, but the present invention is not limited to these. Further, in lieu of the processing of selecting a part of the models based on the actual loading height Hw, the processing of creating a new model of a size based on the actual loading height Hw may be used.

Further, in the second pattern matching processing, the image processor 32 uses a second plurality of models selected or newly created as described above to execute the pattern matching (the second pattern matching) with the image of the photographed image data, and re-selects the model having the highest degree of matching.

Then, the image processor 32 re-detects the planar position (x, y) of the uppermost workpiece W actually loaded in the loading area TA and the loading height (h) of the workpiece W based on the model having the size with the highest degree of matching, which is selected by the second pattern matching processing. The second pattern matching processing makes it possible to detect the planar position (x, y) and the loading height (h) of the workpiece W with higher accuracy than the first pattern matching processing. Further, the image processor 32 transmits, to the workpiece holding robot 10, the information of the planar position (x, y) and the loading height (h) of the uppermost workpiece W that are re-detected by the second pattern matching processing (S19).

Then, when the workpiece holding robot 10 receives the information (x, y, h) relating to the position and the loading height of the workpiece W from the camera system 30 again, the workpiece holding robot 10 executes the transport processing for the uppermost workpiece W based on these pieces of information (S20). Then, the transport processing of the camera system 30 and the workpiece holding robot 10 for the uppermost workpiece W is put to an end, and the processing is now moved to the transport processing for the workpiece W to be located at the uppermost portion.

In the workpiece transport processing step according to the present embodiment, the processing described above is repeatedly executed until the workpiece W is not detected, and when the workpiece W is not detected, the series of workpiece transport processing step is put to an end.

[Advantages of the Workpiece Transport System According to the Present Embodiment]

As described above, the workpiece transport system 1 according to the present embodiment is configured to detect the height error (the "offset height Ho" described above) of the robot hand 20 (the workpiece holding portion) based on the height (the "hand end height Ht" described above) from the mounting pedestal side floor surface FP, on which the mounting pedestal P is mounted, to the connection point between the robot hand 20 (the workpiece holding portion) and the arm unit 12 at the point in time at which the contact with the workpiece W (the detection target) is detected by the surface detection sensor 50, the height from the mounting pedestal side floor surface FP to the surface of the workpiece W (the detection target) (the "detection target height Hs"+ the "mounting pedestal height Hp"− the "floor surface height gap Hgap" described above), and the theoretical value (the "gripper height Hgr" described above) of the height of the robot hand 20 (the workpiece holding portion) so as to detect the actual loading height Hw of the workpiece W mounted on the mounting pedestal P in consideration of the height error.

According to the workpiece transport system 1 related to the present embodiment as described above, there is an advantage that the "actual loading height Hw" of the workpiece W can be calculated with high accuracy by eliminating the error (the error due to the detection accuracy of the surface detection sensor 50) due to the mechanical factors such as the adjustment or the change of the attachment position of the surface detection sensor 50 by the user, or the deflection and the height gap of the hand main body 22 to which the surface detection sensor 50 is attached, for example, in order to detect the "actual loading height Hw" of the workpiece W mounted on the mounting pedestal P in consideration of the "offset height Ho".

[Modification Example]

Although the preferred embodiments of the present invention have been described above, the technical scope of the present invention is not limited to the scope described in the embodiments described above. Various changes or improvements can be made to each of the embodiments described above.

For example, in the embodiments described above, the workpiece holding robot 10 includes the robot control unit 60, and the camera system 30 includes the image processor 32. However, the present invention is not limited to this, and a main body including the robot control unit 60 and the image processor 32 can be arbitrarily changed, and one or both of the robot control unit 60 and the image processor 32 may be brought to a cloud environment. Further, in the embodiment described above, the robot control unit 60 and the image processor 32 are described as being separate components independent of each other, but the present invention is not limited to this. The robot control unit 60 and the image processor 32 may be a single control unit having both of a function as the robot control unit 60 and a function as the image processor 32.

Further, in the embodiments described above, the workpiece holding robot 10 is described as including the offset height measurement unit 62, but the present invention is not limited to this. The camera system 30 may have a configuration including the offset height measurement unit 62, or a system other than the workpiece holding robot 10 and the camera system 30 may have a configuration including the offset height measurement unit 62.

Furthermore, in the embodiments described above, the surface detection sensor 50 is described as being attached to the hand main body 22 of the robot hand 20, but the present invention is not limited to this, and the attachment position of the surface detection sensor 50 can be arbitrarily changed.

In addition, in the embodiments described above, the "detection target height Hs" used for calculating the "offset height Ho" is described as being the thickness of the workpiece W mounted on the mounting pedestal P (in other words, what brings the robot hand 20 into contact with the workpiece W), but the present invention is not limited to this, and may be configured to calculate the "offset height Ho" by bringing the robot hand 20 into contact with another part having a height that can be mechanically fixed or uniquely specified and by using a value of the height of the part as the "detection target height Hs", for example. Note that as such "another part", an upper surface portion of the magnet floater M is exemplified, but is not limited thereto.

It is apparent from the description of the claims that the modification examples as described above are included in the scope of the present invention.

REFERENCE SIGNS LIST

1 Workpiece transport system
10 Workpiece holding robot
12 Arm unit
20 Robot hand (workpiece holding portion)
30 Camera system
32 Image processor
37 Actual loading height calculation unit
40 Camera
50 Surface detection sensor
60 Robot control unit
62 Offset height measurement unit
70 Offset height registration screen
CG Calibration gripper
CJ Calibration jig
F Floor surface
FP Mounting pedestal side floor surface
FR Robot side floor surface
Hbt Hand end height when a base coordinate origin is used as a reference
Hgap Floor surface height gap
Hgr Gripper height
Hj Height of the calibration jig
Ho Offset height (height error of the workpiece holding portion)
Hp Height of a mounting pedestal
Hs Height of a detection target
Ht Hand end height when a bottom surface of the mounting pedestal is used as a reference
Hw Actual loading height of a workpiece
P Mounting pedestal
S Control axis (predetermined reference part of the workpiece holding robot)
TA Loading area
W Workpiece

The invention claimed is:

1. A workpiece transport system, comprising:
a mounting pedestal on which a workpiece can be mounted; and
a workpiece holding robot configured to be able to transport, from the mounting pedestal, the workpiece mounted on the mounting pedestal,
the workpiece holding robot including a workpiece holding portion capable of holding the workpiece, an arm unit configured to bring the workpiece holding portion close to or away from a detection target, and a surface detection sensor capable of detecting that the workpiece holding portion is brought into contact with the detection target, the workpiece transport system being configured to detect a height error of the workpiece holding portion based on a height from a mounting pedestal side floor surface, on which the mounting pedestal is mounted, to a connection point between the workpiece holding portion and the arm unit at a point in time at which contact with the detection target is detected by the surface detection sensor, a height from the mounting pedestal side floor surface to a surface of the detection target, and a theoretical value of a height of the workpiece holding portion, and to detect an actual loading height of the workpiece mounted on the mounting pedestal in consideration of the height error of the workpiece holding portion.

2. The workpiece transport system according to claim 1, wherein the height from the mounting pedestal side floor surface to the surface of the detection target includes:
- a height from the mounting pedestal side floor surface to a surface of the mounting pedestal; and
- a height of the detection target mounted on the mounting pedestal.

3. The workpiece transport system according to claim 2, wherein the height from the mounting pedestal side floor surface to the surface of the mounting pedestal is detected based on:
- a mounting pedestal height from a robot side floor surface on which the workpiece holding robot is installed to the surface of the mounting pedestal; and
- a height gap between the mounting pedestal side floor surface and the robot side floor surface.

4. The workpiece transport system according to claim 3, wherein the mounting pedestal height is detected based on:
- a height of a calibration jig mounted on the mounting pedestal;
- a height of a calibration gripper mounted to the arm unit in lieu of the workpiece holding portion;
- a height from the robot side floor surface to a predetermined reference part of the workpiece holding robot at a point in time at which the calibration gripper is brought into contact with the calibration jig; and
- a height from the reference part to a connection point between the calibration gripper and the arm unit at a same point in time.

5. The workpiece transport system according to claim 1, further comprising a camera system configured to photograph the workpiece mounted on the mounting pedestal so as to detect a position and a loading height of the workpiece based on an image of the photographed workpiece, wherein the camera system includes:
- a camera capable of photographing the workpiece mounted on the mounting pedestal; and
- an image processor configured to detect the position and the loading height of the workpiece based on the photographed image of the workpiece photographed by the camera, and the image processor is configured to calculate the actual loading height in consideration of the height error of the workpiece holding portion.

6. The workpiece transport system according to claim 5, wherein the image processor is configured to calculate the actual loading height based on:
- the height from the mounting pedestal side floor surface, on which the mounting pedestal is mounted, to the connection point between the workpiece holding portion and the arm unit;
- the height error of the workpiece holding portion;
- the height from the mounting pedestal side floor surface to the surface of the mounting pedestal; and
- the theoretical value of the height of the workpiece holding portion.

7. The workpiece transport system according to claim 5, wherein the camera is configured to photograph the workpiece mounted on the mounting pedestal from obliquely above.

8. A workpiece transport method for transporting, from a mounting pedestal, a workpiece mounted on the mounting pedestal with a workpiece holding robot, the workpiece holding robot including a workpiece holding portion capable of holding the workpiece, an arm unit configured to bring the workpiece holding portion close to or away from a detection target, and a surface detection sensor capable of detecting that the workpiece holding portion is brought into contact with the detection target, the workpiece transport method comprising: detecting a height error of the workpiece holding portion based on a height from a mounting pedestal side floor surface, on which the mounting pedestal is mounted, to a connection point between the workpiece holding portion and the arm unit at a point in time at which contact with the detection target is detected by the surface detection sensor, a height from the mounting pedestal side floor surface to a surface of the detection target, and a theoretical value of a height of the workpiece holding portion; and detecting an actual loading height of the workpiece mounted on the mounting pedestal in consideration of the height error of the workpiece holding portion.

* * * * *